Nov. 11, 1941.    K. A. BROWNE    2,261,955
RESILIENT ENGINE MOUNT
Filed Nov. 13, 1939

INVENTOR
KENNETH A. BROWNE
BY
ATTORNEY

Patented Nov. 11, 1941

2,261,955

UNITED STATES PATENT OFFICE 2,261,955

RESILIENT ENGINE MOUNT

Kenneth A. Browne, Woodcliff Lake, N. J., assignor to Wright Aeronautical Corporation, a corporation of New York Application November 13, 1939, Serial No. 304,031

12 Claims. (Cl. 248—5)

This invention relates to resilient engine mounting devices and is particularly concerned with mounting mechanism for aircraft engines which overhang from a supporting structure to the end that various modes of forced vibrations generated in the engine will be completely isolated from the supporting structure at normal operating speeds.

In general, the invention is closely related to those inventions covered in Browne and Taylor Patent No. 2,175,825, and in the Taylor Patent No. 2,175,999, both issued October 10, 1939. The invention has for a particular object the provision of apparatus by which presently standardized forms of rubber bushings may be incorporated in engine mounts which subscribe to the teachings of the above mentioned patents, and it might be here mentioned that the standardized rubber bushings, with which the invention is concerned, are disclosed in Carleton Patent No. 2,109,329, issued March 25, 1938.

After the development of the engine mount according to the Carleton patent, the rubber bushings disclosed therein became widely used in structures either identical with or similar to those structures shown in the Carleton patent. These devices were convenient to use and allowed a greater amount of torsional freedom in the engine mount than had previously been obtained by the use of concentric rubber bushings. However, when the Taylor and Brown and Taylor teachings became available in the art, aircraft manufacturers were quick to realize the important advantages flowing from said teachings, but the methods taught by Taylor and Browne and Taylor involved the use of rubber units bonded to structural elements which forthwith made obsolete the previous type of mount according to the Carleton teachings.

This invention provides an arrangement by which the advantages of the Taylor and Browne and Taylor invention may be gained while using the simple rubber bushing of the Carleton patent, and provides a further advantage in that the rubber elements of the system need not be bonded to the adjacent structural elements.

A further object of the invention is to provide an engine mounting assembly which has three principal axes for elastic yield, wherein the spring rate of the device along each axis is different from the spring rate along each other axis, a further object providing means by which there is complete freedom along one of said axes.

Further objects of the invention will be appreciated in reading the annexed detailed description in connection with the drawing, in which.

Figure 1:
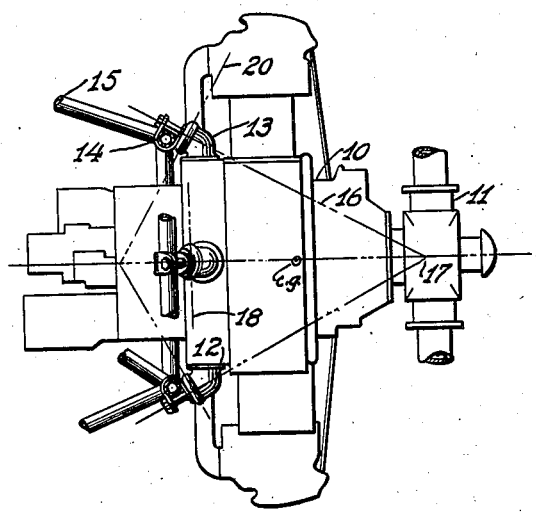
Fig. 1 is a side elevation of an engine mounted according to the invention.

In Fig. 1 I show an engine 10 of the radial air-cooled type having a propeller 11 at its forward end and having a crankcase section 12 to which are secured a plurality of resilient mounting units 13 circumferentially disposed around the periphery thereof, these units 13 in turn being secured to an engine mounting ring 14 forming part of the mount structure 15. To procure vibration isolation, according to the teaching of the Taylor patent above mentioned, it is necessary that the stiffest axes of the several mounting units 13, indicated at 16, intersect at a point 17 on the engine axis farther from the mounting plane than the center of gravity of the power plant, indicated as c. g. Also, according to the Taylor teaching, the spring rate of the mounting units on an axis tangent to the mounting circle, indicated at 18, may be equal to or somewhat less than the stiff spring rate. The stiffness of the mounting unit, along an axis normal to the axis 16 and including the engine axis, must be less than the other two and, according to the Browne and Taylor teaching, this latter axis, indicated at 20, may have no elastic restraint whatever.

Figure 2:
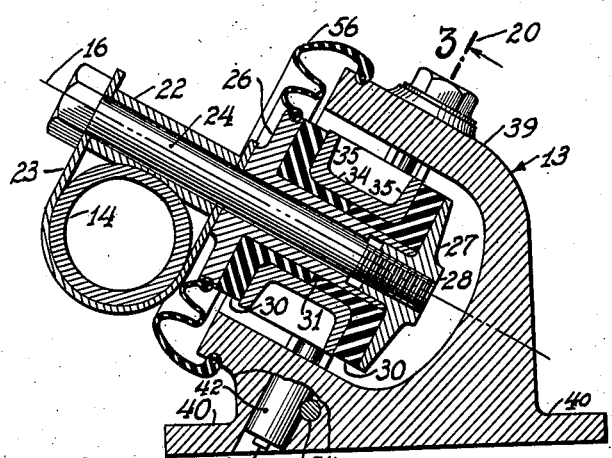
Fig. 2 is a longitudinal section, enlarged, of one of the engine mounting assemblies, also comprising a section on the line 2—2 of Fig. 3.
Figure 3:
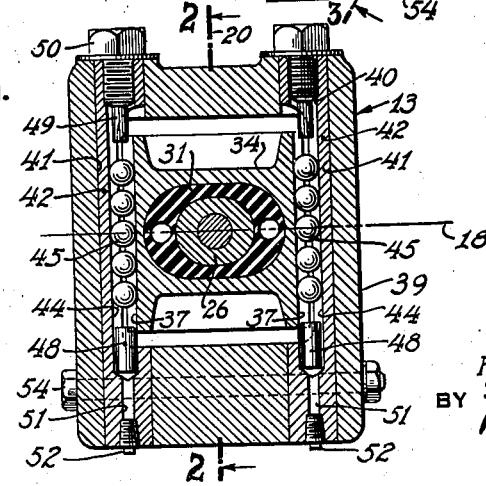
Fig. 3 is a section on the line 3—3 of Fig. 2.

Figs. 2 and 3 show the specific details of the units 13 and the principal axes 16, 18, and 20 are indicated thereon.

To the mounting ring 14 a bushing 22 is secured by a strap 23 and through the bushing is passed a bolt 24, on the axis 16, on which is mounted a spool 26 having a flange 27 forming a unit therewith by the engagement of the threaded end of the bolt 24 with threaded hub 28 of the flange 27. Embracing the spool 26 are a pair of rubber bushings comprising end flanges 30 engaging the flanges of the spool 26 and a central portion 31 whose interior opening is complementary in profile to the exterior of the shank of the spool 26, but whose exterior profile is oval, as indicated in Fig. 3. The major axis of said oval is aligned with the axis 18. The bushings 30, 31 are made in two sections for convenient assembly although they may comprise a single piece. They are embraced by an intermediate member 34 having an opening complementary in shape to the oval of the bushing and having end elements 35 in contact with the inner faces of the bushing flanges 30. On opposite sides of the member 34 grooves 37 are formed, these grooves being parallel and being disposed parallel to and in a plane occupying the free axis 20.

Embracing the spool, the rubber bushings, and the intermediate member is a hollow housing 39 provided with flanges 40 for securement to the engine crankcase 12, the housing being open at one end of the hollow to receive the spool, bushings, and the intermediate member. Parallel bores 41 are formed in the housing, these bores being parallel to respective grooves 37 and in these bores are located pins 42 of hardened material. These pins 42, as will be obvious from Fig. 3, are flattened in their mid portions and are grooved as at 44, the grooves respectively lying parallel to and in opposition to the grooves 37 of the intermediate member 34. Upon assembly and alinement of the member 34 and the member 39, a plurality of bearing balls 45 may be dropped through an opening 46 in the top of each pin 42 so that the balls engage between the grooves 37 and 44 to lock the intermediate member in the housing. However, the balls permit free movement of the member 34 along the axis 20 while securing the intermediate member against any displacement along the axes 16 or 18. The balls are held in their proper location by means of bottom pins 48 and by means of pins 49 integral with cap screws 50 screwed into the openings 46. Drillings 51, closed by plugs 52, are provided in the bottom ends of the pins 42 by which removal of the balls is made possible by the insertion of a slender rod, such rod being pressed upwardly after removal of the cap screws 50 to push the balls out of the assembly whereby the parts of the latter may be separated.

The pins 42 are prevented from turning in the housing 39 by a cross bolt 54 which engages suitable notches in the surface of the pins. Preferably, a boot 56 is secured at its ends to the housing 39 and to the flange of the spool 26 to provide a closure for the open end of the hollow in the housing 39, this boot serving to prevent the entrance of dust into the mechanism and to retain lubricant therein which is necessary for free operation of the bearing balls 45.

In the operation of the assembly, according to the Browne and Taylor teaching, it will be seen that the rubber bushing flanges 30 provide stiff elastic restraint along the axis 16. The end portions of the bushings 31 provide an intermediate elastic restraint along the axis 18, while the balls 45 in their grooves 37 and 44 provide for freedom in the mounting assembly along the axis 20. In certain installations the rubber bushings 30, 31 may be identical in form to those outlined in the Carleton patent but the proportions of the bushing may be changed as necessary to accommodate them to any specific requirements of design. It will be seen that the bushings 30, 31 are virtually wholly confined between the spool 26 and the intermediate member 34 so that there is no necessity for bonding the rubber to the adjacent structural elements, thereby affording means by which the rubber may be replaced in service with little difficulty and small expense. The elastic restraint afforded by the bushings is obtained wholly by compression stress in the rubber, whereby bonding is unnecessary, as distinguished from tensile and shear stress in the rubber in bonded bushings when the bushing sleeves are respectively moved radially or axially relative to one another. Also, provision has been made for extrusion of the rubber when compressively stressed which is necessary since when wholly confined the rubber is relatively inelastic. The metallic parts of the assembly are adapted for long service and will need replacement much less frequently than the rubber, whereas, when the rubber is bonded to attaching elements, both the rubber and some of the metallic elements must be replaced.

Although the drawing shows the housing 39 secured to the engine, and the spool 26 secured to the mounting structure, it is obvious that the disposition of the elements may be reversed. Also, although I have shown the housing 39 embracing all of the rubber bushing structure; this housing may be skeletonized if desired.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An engine mounting assembly comprising an engine unit having opposed tracks, an intermediate member slidable on said tracks having an oval opening axially normal to the plane of sliding, the major axis of the oval being in the plane of the tracks and normal to the direction thereof, an elastic bushing of rubber or the like substantially filling said opening and overlying the ends of the member, and a support element passing through and clamped over the overlying portions of said bushing.

2. An assembly for mounting an engine member upon a support member comprising a track secured to one member, an intermediate member mounted and freely slidable upon said track, and an elastic member secured to said intermediate member and to the other member in vibration insulating relation thereto.

3. In an engine mounting assembly, a spool member embraced by a flanged bushing of rubber or the like, an intermediate member embracing said bushing and lying between the flanges thereof so that the rubber isolates one member from the other, linear tracks on each side of said intermediate member lying in a plane normal to the bushing axis, a housing embracing said members having tracks therein adjacent respective member tracks, and bearing means engaging respective tracks organized to allow of free relative movement of the member relative to the housing in the plane of said tracks.

4. In an engine mounting assembly, an embracing member having opposed coplanar grooves therein, an inner member having outwardly facing coplanar grooves respectively lying opposite the grooves of the embracing member, a plurality of balls between the members in said pairs of grooves whereby the inner member is freely movable relative to the embracing member along the path defined by said balls and grooves, an elastic bushing embraced by said inner member, and a mounting element embraced by said bushing.

5. In an engine mounting assembly, an embracing member having opposed coplanar grooves therein, an inner member having outwardly facing coplanar grooves respectively lying opposite the grooves of the embracing member, a plurality of balls between the members in said pairs of grooves whereby the inner member is freely movable relative to the embracing member along the path defined by said balls and grooves, an elastic bushing embraced by said inner member, and a mounting element embraced by said bushing, said bushing being so formed as to have dominant axes normal to the said path and to each other, allowing of elastic displacement of the mounting element relative to said other elements, whereas displacement along the said path is free of elastic restraint.

6. In a mounting connection between a support member and an engine member overhung therefrom, a resilient connector therebetween comprising axially slanted flanged bushings of rubber or the like, means engaging the bushing bores and flange outsides secured to one member, an element engaging the bushing exterior and flange inner surfaces, and means secured to the other member engaged with said element for free movement relative thereto in a direction normal to the bushing axis.

7. In a mounting connection between a support member and an engine member overhung therefrom, a resilient connector therebetween comprising elements separated by rubber, one said element being secured to one said member, and a free linear sliding connection between the other said element and the other said member.

8. In a mounting connection between a support member and an engine overhung therefrom, a mounting unit comprising an elastic cushion, elements respectively passing through and embracing the cushion and isolated thereby from one another, one said element being secured to one said member, means secured to the other said member, and a freely slidable linear connection between said means and the other said element.

9. A mounting unit for a vibratory body comprising two elements having a linear free sliding connection with one another, a third element secured to and movable with and with respect to one of the elements through an elastic cushion of rubber or the like, and means on the other and third element for securing them respectively to the body and to a support.

10. In the mounting of a vibratory body member upon a support member, elements respectively secured to said members, an intermediate element, a linear free sliding connection between one of the elements and the intermediate element, and an elastic cushion of rubber or the like between the other element and said intermediate element.

11. In the mounting of a vibratory body member upon a support member, elements respectively secured to said members, an intermediate element, a linear free sliding connection between one of the elements and the intermediate element, and an elastic cushion of rubber or the like between the other element and said intermediate element, said cushion having two principal axes of differential spring rate both normal to the direction of action of said sliding connection.

12. An assembly for mounting an engine member upon a support member comprising a substantially linear guideway on one member, an intermediate member substantially freely movable along said guideway, and an elastic element joining the intermediate member with the other said member to afford vibration insulation therebetween.

KENNETH A. BROWNE.